Patented Apr. 6, 1937

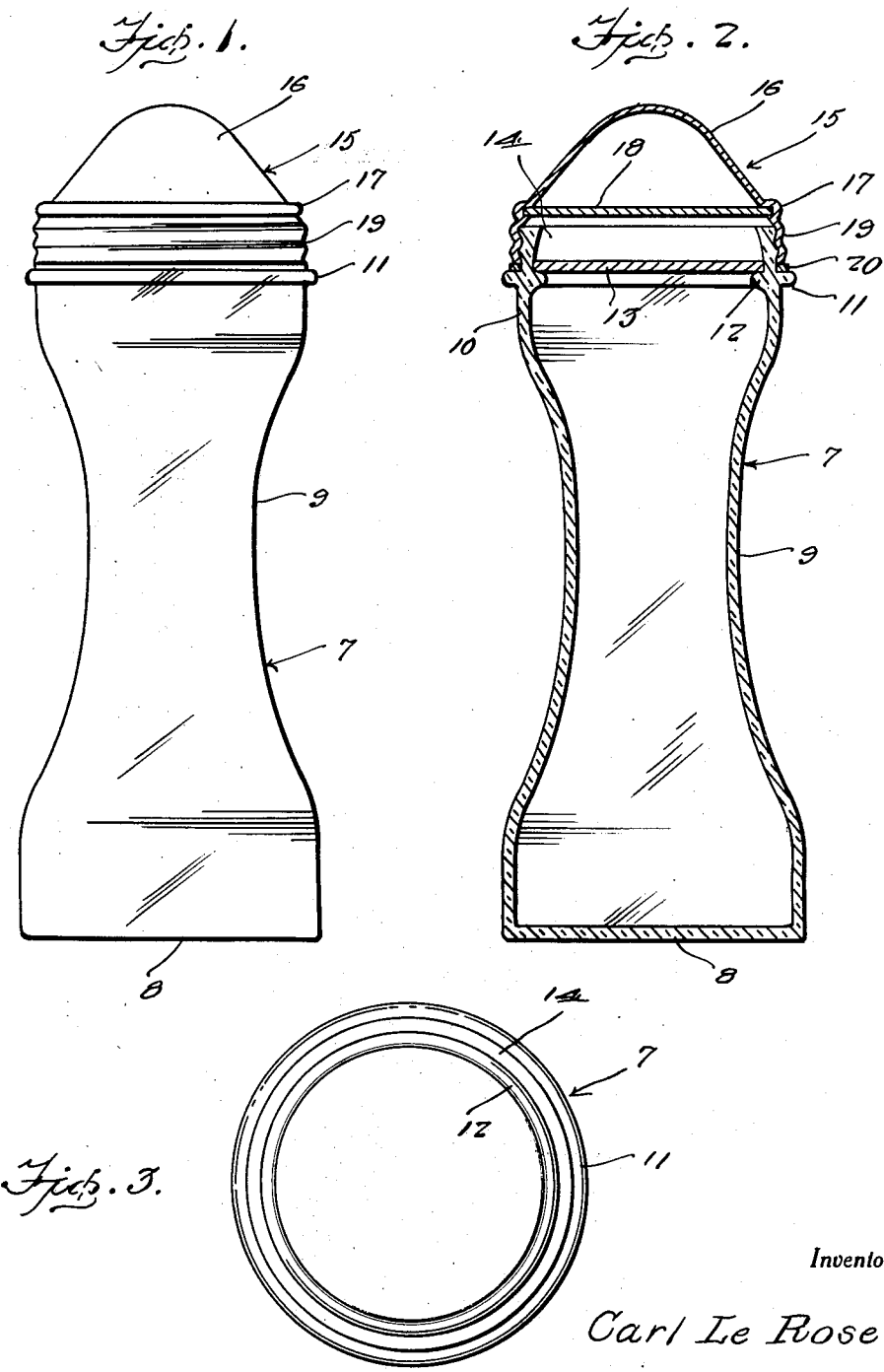

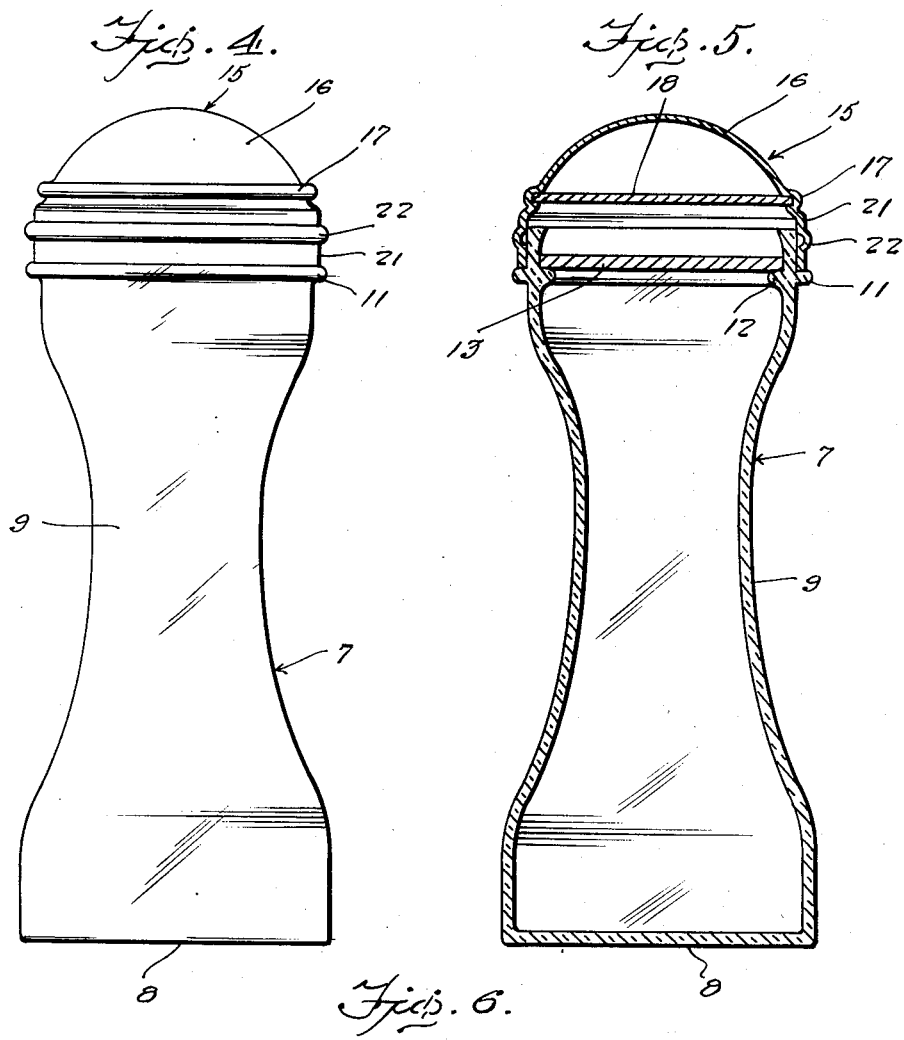

2,076,132

UNITED STATES PATENT OFFICE 2,076,132

PREPARED BEVERAGE CONTAINER

Carl Le Rose, West New York, N. J.

Application August 31, 1935, Serial No. 38,832

5 Claims. (Cl. 206—47)

This invention relates to a unique combination ready mixed or prepared beverage and container and has more specific reference to an accessory for handling ice cream sodas.

Briefly, the conception comprehends an arrangement comprising a receptacle for the liquid designed to contain the pre-mixed soda, such receptacle having an especially designed closure to function as an individual holder for the complemental dip or scoop of ice cream.

Stated otherwise it is my object to provide a self-contained ice cream soda wherein the soda water or other liquid is separately confined in an especially designed handling and drinking glass, and the companion portion of ice cream individually held in the cover in a position to permit it to be readily placed in the soda water to make a refreshing ice cream soda for individual or personal consumption.

Novelty is predicated upon the adoption and use of an appropriately proportioned and shaped soda water glass whose mouth or neck portion is constructed to accommodate the detachable cover and is internally constructed to accommodate a temporary closing lid such as for example a paperboard disk of the type commonly used as a milk bottle cap.

By the same token equal novelty is embodied in the adoption and use of a cover or closure fastened to hold the desired amount of ice cream, this being provided with a similar releasable temporary stopper to keep the ice cream intact.

In keeping with my idea to perfect an arrangement susceptible of having the commercial requisites I provide these individually capped companion containers so that the one holding the liquid or soda water can be kept on ice conveniently and without freezing, while the one holding the scoop of ice cream may be conveniently maintained in a refrigerator to retain it properly frozen.

Other features and advantages will become readily apparent from the following description and drawings.

In the drawings:

Figure 1 is an elevational view of one embodiment of the invention showing the screw type of closure.

Figure 2 is a vertical sectional view through the structure depicted in Figure 1.

Figure 3 is a top plan view of the bottle-like soda water glass, the stopper or cap being removed.

Figure 4 is a view similar to Figure 1 showing a further embodiment of the invention when the closure has a plain or non-screw type rim.

Figure 5 is a sectional view through the arrangement shown in Figure 4.

Figure 6 is a top plan view of the glass or soda container.

By way of introduction it is thought that in both embodiments of the invention the parts may well be designated by the same distinguishing reference characters inasmuch as they are fundamentally or basically the same. Proceeding with this idea in mind it will be observed that the numeral 7 designates a bottle-like receptacle or container having a flat bottom 8, a transversely reduced restricted central portion 9 and a jar-like mouth or neck portion 10. Incidentally, the central spool-like portion 9 is shaped in the manner illustrated to provide a convenient hand grip. Not only does the spool-like reduced central portion function in the aforesaid manner, but it has the important function of dividing the container vertically into upper and lower compartments, the upper compartment being of such proportions in diameter as to receive a predetermined amount of ice cream such as is contained in the hereinafter described lid. Thus, this formation prevents the ice cream from submerging too deeply into the soda liquid. I might also point out that any suitable material may be used in the construction of this particular part 7, that is it may be of glass, metal or a similar durable grade of material. I might say, however, that by preference it will be of an appropriate glass so that it actually has the function not only of a bottle, but a drinking glass. It will be observed that the neck is provided with an outstanding or external annular flange 11 and an inner annular flange 12. The inner flange 12 is adapted to serve as a ledge or seat for the disk stopper or cap 13. It is to be observed that the lower surface of the flange 12 merges gradually into the body portion of the bottle so as to provide a beveled formation, and the edge or lip portion of the flange is rounded, this being so as to function as a deflector and to facilitate discharging or drinking the soda in a manner hereinafter more explicitly described. As before stated this part 13 is an ordinary quick removable cardboard cap such as used in present day milk bottles. That portion of the glass which projects above the flanges 11 and 12 forms the neck proper. It will be observed that the cross sectional dimension thereof is thickened at the extreme upper edge and curved inwardly as indicated at the point 14 to provide a retention lip. This aids in providing a tight snap-in fit for the stopper 13. At the same time it does not materially hinder extraction of the cap when it is desired to consume the contents of the glass. The outer periphery of this neck in Figures 1 and 2 is screw threaded. The corresponding periphery in the embodiment shown in Figures 4 and 5 is smooth or non-threaded. This is the only difference between the two containers shown in Figures 1 and 2 as distinguished from Figures 4 and 5 as is obvious.

Generically the closures 15 in both forms of the invention are fundamentally the same. The closures are preferably made from metal or some material which is found most suitable for handling ice cream in the manner herein utilized. The shape and proportion will vary according to the amount of ice cream to be packed therein. In any event however the crown portion is generally somewhat rounded so that it is in a sense an inverted ice cream cup 16. At the point 17 is an annular channel which serves as a keeper for the second stopper or cap 18 which is also a conventional milk bottle cap. In Figures 1 and 2 the rim 19 is screw threaded to cooperate with the threads on the complemental neck. Incidentally the numeral 20 designates suitable packing. In the arrangement shown in Figures 4 and 5 the rim 21 is plain or smooth to fit telescopically on the correspondingly made neck, though the rim is here shown as provided with an outstanding annular bead 22 which functions as a reinforcing rib.

In practice the pre-mixed plain soda drink is placed in the glass or receptacle 7. Then the cap 13 is put in place. The scoop or dip of ice cream is placed in the cover-cup 16. Likewise the stopper or cap 18 is snapped into the keeper channel 17. It is then intact and ready for use. In manufacturing however the procedure of handling a combination of this character will vary according to varying conditions. For example if the prepared or made up soda is dispensed from delivery automobiles such as are frequently used for selling products of this nature on the city streets, the soda water and ice cream will be placed in their respective receptacles and the two receptacles joined together. In this connection the type of the invention illustrated in Figures 1 and 2 using screw caps will be necessarily used. Then by putting the combination article in cold storage on the truck or other delivery vehicle it is ready for sale. When the buyer or consumer gets it all that is necessary is to remove the respective caps 13 and 18 and to place the ice cream into the liquid in the bottle or glass 7 and a delicious ice cream soda is ready for use.

At soda fountains and similar confectionary stores the parts 7 and 15 are generally stored separately although this is not absolutely essential under all conditions. It has been found practicable however to merely keep the soda in the container 7 on ice separately from the ice cream for the ice cream requires more constant and cold refrigeration. Therefore the cup or cap 16 is kept in a refrigerator and when a soda is ordered to take out all that is necessary is to screw on the cover 15 and the article is ready to be carried away for home use. Of course there would be steps involving charges and return of the articles 7 and 15 but this is of no consequence so far as the present disclosure is concerned. It is thought however that novelty is found not only in the physical construction of the parts themselves but in the method of handling a prepared or pre-mixed ice cream soda in the way herein shown and described.

It is evident that in some instances the screw-on type of closure is preferable over the quick detachable non-screw type shown in Figures 4 and 5. It is therefore my desire to cover both styles in order to meet the public demand adequately.

By way of introduction to the claims I feel disposed to say that novelty is predicated upon the parts 7 and 15 separately and collectively. The part 7 having the additional function of a bottle as well as a drinking glass is unique, and due to its particular shape and capacity for use is believed to be an innovation in this line of endeavor. The idea of shaping the part 9 to function as a convenient hand grip while not broadly new is believed to be new so far as it relates to a transportable bottle for a commodity of goods to be consumed in the manner herein described.

Emphasis is also attached to the special adaptation of the part 15 which serves as an effective and fluid tight closure for the so-called bottle under certain conditions and serves individually to permit the ice cream to either be mixed with the liquid in the container 7 or to be eaten separately from the part 16 as a cup. Of primary importance however is the fact that this feature 16 is so well adapted to either be applied and kept in storage in conjunction with the container 7 or to be stored and properly refrigerated alone. This separable feature is also unique in that it permits the desired flavors of ice cream and sodas to be selected and combined according to the particular order to be filled.

As before indicated the specific configuration of the glass 7 is intentional. Not only does it provide the requisite design for easy handling as before stated, but is of such formation as to prevent the charge of ice creame from submerging too deeply into the soda. In other words the inwardly curved central portion 10 keeps the ice cream suspended at the top and substantially near the top edge of the glass. This feature of construction is important in that it prevents the ice cream from displacing its weight and causing the liquid to overflow the mouth of the bottle. I also wish to emphasize the beveled and rounded edge formation of the flange as well as its placement below the top or rim of the glass. By lowering the flange into the glass it provides extra height to take up partial displacement of the soda when the ice cream is submerged. Manifestly, if the flange were placed at the extreme top as in the case of a milk bottle, the level of the soda would be too high and this displacement feature would not be taken care of properly. Not only this takes place but the flange serves as a guide and aids filling the liquid to a point below said flange. Of most importance however is the fact that the flange is beveled to provide the desired deflection of the liquid while either pouring it from the jar or drinking it directly therefrom. In other words it avoids splashing against the under side of the rim. With this particular construction the soda is retarded and flows smoothly over the rounded edge of the flange and also provides for sanitation in that it makes it easy to clean and sterilize the glass when reused.

It goes without saying that although the invention is designed for use in handling prepared ice cream sodas it is usable in other lines of endeavor where the ingredients of the finally mixed product are desired to be kept separate until ready for consumption.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

What is claimed is:

1. A prepared beverage container construction of the class described comprising a beverage containing and drinking glass open at its top and provided with an internal stopper seating ledge disposed on a plane spaced downwardly from the extreme upper end, a removable stopper located in said upper end portion and seated on said ledge, an inverted ice cream containing cup formed at its bottom with a screw-threaded rim separably connected with said neck, said cup at the juncture of the rim and body portion being formed into a keeper channel, and a removable stopper located in said keeper channel and disposed in spaced parallelism to the upper end of the glass.

2. In a multiple purpose beverage containing and mixing device of the class described, a beverage containing and drinking glass open at its top and provided with internal and external lateral flanges constituting reinforcing beads and stop elements and formed above said flanges with an upstanding externally screw threaded attaching neck, a removable stopper located in said neck and seated on said internal flange, an inverted ice cream containing cup formed at its bottom with a depending screw threaded attaching rim resting on said external flange and detachably connected with said neck, and a second removable stopper located in said cup and disposed in spaced parallelism above said first named stopper to define an article containing compartment between said stoppers.

3. In a multiple purpose beverage containing and drinking device of the class described, a beverage containing and drinking glass open at its top and provided with internal and external lateral flanges constituting reinforcing beads and stop elements and formed above said flanges with an upstanding externally screw threaded attaching neck, a removable stopper located in said neck and seated on said internal flange, an inverted ice cream containing cup formed at its bottom with a depending screw threaded attaching rim resting on said external flange and detachably connected with said neck, and a second removable stopper located in said cup and disposed in spaced parallelism above said first named cap to define an article containing compartment between said stopper, said first named stopper being of a diameter less than the second named stopper and the second named stopper being spaced above the lip portion of said neck.

4. In an assemblage of the class described, in combination, a drinking glass of the class described comprising a receptacle provided at its open top with an internal ledge, and a removable stopper seated on said ledge, said stopper being disposed on a plane space downwardly from the discharge lip portion of the mouth of the receptacle, an inverted dome-shaped cup adapted to contain a predetermined quantity or scoop of ice cream, said cup including a screw threaded attaching rim connectible with said receptacle, and being provided with an internal removable stopper spaced above the lip of the receptacle in the manner and for the purposes described.

5. As a new article of manufacture and as a component part of an assemblage of the class described, a bottle closure in the form of a metal closing cap, said cap being proportioned and shaped to receive and contain a predetermined portion of ice cream and to thereby function as an ice cream cup and being provided at its open end with a circumferentially corrugated extension defining a screw-threaded attaching rim, the innermost convolution of said rim being sufficiently deep in cross-sectional dimension to provide an annular keeper channel, and a removable disk-like stopper seated in said channel.

CARL LE ROSE.